US010796199B1

(12) United States Patent
Xu et al.

(10) Patent No.: US 10,796,199 B1
(45) Date of Patent: Oct. 6, 2020

(54) IMAGE RECOGNITION AND AUTHENTICATION

(71) Applicant: Alibaba Group Holding Limited, George Town (KY)

(72) Inventors: Wei Xu, Hangzhou (CN); Jidong Chen, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/805,530

(22) Filed: Feb. 28, 2020

Related U.S. Application Data

(63) Continuation of application No. PCT/CN2020/070909, filed on Jan. 8, 2020.

(30) Foreign Application Priority Data

May 29, 2019 (CN) .......................... 2019 1 0456505

(51) Int. Cl.
*G06K 9/00* (2006.01)
*G06K 9/62* (2006.01)
(Continued)

(52) U.S. Cl.
CPC ........ *G06K 9/6232* (2013.01); *H04M 1/0264* (2013.01); *H04N 5/2354* (2013.01);
(Continued)

(58) Field of Classification Search
None
See application file for complete search history.

(56) References Cited

U.S. PATENT DOCUMENTS

2003/0235334 A1 12/2003 Okubo
2015/0026785 A1* 1/2015 Soon-Shiong ..... G06Q 30/0207
726/7
2016/0034783 A1* 2/2016 Cheng ...................... G06T 7/13
382/195

FOREIGN PATENT DOCUMENTS

CN 104252473 12/2014
CN 105118048 12/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Wei Wen Yang
(74) *Attorney, Agent, or Firm* — Fish & Richardson P.C.

(57) ABSTRACT

Implementations of the present specification disclose image recognition methods, apparatuses, and devices, and authentication methods, apparatuses, and devices. A solution includes the following: obtaining a target image of a target object, where before the target image is obtained, a recognition identifier is mapped onto the target object, and where the recognition identifier is used to form a corresponding recognition feature in the target image; and determining an attribute of the target object corresponding to the target image based on a predetermined mapping relationship and the recognition feature, where the mapping relationship includes a corresponding relationship between the recognition feature and the attribute of the target object.

30 Claims, 5 Drawing Sheets

(51) Int. Cl.
  *H04M 1/02*   (2006.01)
  *H04N 5/235*  (2006.01)
(52) U.S. Cl.
  CPC .... *G06K 2209/011* (2013.01); *G06K 2209/21* (2013.01); *H04M 2250/52* (2013.01)

(56)  References Cited

FOREIGN PATENT DOCUMENTS

| | | |
|---|---|---|
| CN | 107944339 | 4/2018 |
| CN | 108573202 | 9/2018 |
| CN | 109145768 | 1/2019 |
| CN | 109409245 | 3/2019 |
| CN | 110263775 | 9/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/070909, dated Apr. 13, 2020, 19 pages (with machine translation).

\* cited by examiner

IMAGE RECOGNITION AND AUTHENTICATION

CROSS-REFERENCE TO RELATED APPLICATIONS

This application is a continuation of PCT Application No. PCT/CN2020/070909, filed on Jan. 8, 2020, which claims priority to Chinese Patent Application No. 201910456505.1, filed on May 29, 2019, and each application is hereby incorporated by reference in its entirety.

TECHNICAL FIELD

Implementations of the present specification relate to the field of computer technologies, and in particular, to image recognition methods, apparatuses, and devices, and authentication methods, apparatuses, and devices.

BACKGROUND

With the advancement of technologies, more businesses can be handled remotely, such as account opening (such as financial accounts). When remotely processing businesses, the authenticity of one or more objects may be verified.

SUMMARY

Implementations of the present specification provide image recognition methods, apparatuses, and devices, and authentication methods, apparatuses, and devices, to recognize image categories.

The following technical solutions are used in the implementations of the present specification:

An implementation of the present specification provides an image recognition method, including the following: obtaining a target image of a target object, where before the target image is obtained, a recognition identifier is mapped onto the target object, and where the recognition identifier is used to form a corresponding recognition feature in the target image; and determining an attribute of the target object corresponding to the target image based on a predetermined mapping relationship and the recognition feature, where the mapping relationship includes a corresponding relationship between the recognition feature and the attribute of the target object.

An implementation of the present specification provides an authentication method, including the following: obtaining a first target image of a target object, where before the first target image is obtained, a recognition identifier is mapped onto the target object, and the recognition identifier is used to form a corresponding recognition feature in the first target image; determining an attribute of the target object corresponding to the first target image based on a predetermined mapping relationship and the recognition feature, where the mapping relationship includes a corresponding relationship between the recognition feature and the attribute of the target object; and authenticating the target object based on a determining result.

An implementation of the present specification provides an image recognition apparatus, including the following: an acquisition unit, configured to obtain a target image of a target object, where before the target image is obtained, a recognition identifier is mapped onto the target object, and where the recognition identifier is used to form a corresponding recognition feature in the target image; and a recognition unit, configured to determine an attribute of the target object corresponding to the target image based on a predetermined mapping relationship and the recognition feature, where the mapping relationship includes a corresponding relationship between the recognition feature and the attribute of the target object.

An implementation of the present specification provides an authentication apparatus, including the following: an acquisition unit, configured to obtain a first target image of a target object, where before the first target image is obtained, a recognition identifier is mapped onto the target object, and the recognition identifier is used to form a corresponding recognition feature in the first target image; a recognition unit, configured to determine an attribute of the target object corresponding to the first target image based on a predetermined mapping relationship and the recognition feature, where the mapping relationship includes a corresponding relationship between the recognition feature and the attribute of the target object; and an authentication unit, configured to authenticate the target object based on a determining result.

An implementation of the present specification provides an electronic device, including: at least one processor; and at least one memory, where the memory stores a program, and the at least one processor is configured to perform the following steps: obtaining a target image of a target object, where before the target image is obtained, a recognition identifier is mapped onto the target object, and where the recognition identifier is used to form a corresponding recognition feature in the target image; and determining an attribute of the target object corresponding to the target image based on a predetermined mapping relationship and the recognition feature, where the mapping relationship includes a corresponding relationship between the recognition feature and the attribute of the target object.

An implementation of the present specification provides an electronic device, including: at least one processor; and at least one memory, where the memory stores a program, and the at least one processor is configured to perform the following steps: obtaining a first target image of a target object, where before the first target image is obtained, a recognition identifier is mapped onto the target object, and the recognition identifier is used to form a corresponding recognition feature in the first target image; determining an attribute of the target object corresponding to the first target image based on a predetermined mapping relationship and the recognition feature, where the mapping relationship includes a corresponding relationship between the recognition feature and the attribute of the target object; and authenticating the target object based on a determining result.

The previous at least one technical solution used in the implementations of the present specification can achieve the following beneficial effects, the target image of the target object is obtained, where before the target image is obtained, the recognition identifier is mapped onto the target object, and the recognition identifier is used to form the corresponding recognition feature in the target image. As such, a difference generated by the recognition identifier on the target object is used to form the recognition feature that can be used for recognition on the target image, so that the recognition feature generated based on the difference is actively added to the recognition process. Then, the attribute of the target object corresponding to the target image is determined based on the predetermined mapping relationship and the recognition feature, where the mapping relationship includes the corresponding relationship between the recognition feature and the attribute of the target object. As such, accuracy of recognizing the target image is effectively improved.

BRIEF DESCRIPTION OF DRAWINGS

The accompanying drawings described here are intended to provide a further understanding of the implementations of the present specification, and constitute a part of the implementations of the present specification. The example implementations of the present specification and the descriptions of the example implementations are intended to explain the present application, and do not constitute an undue limitation on the present application. In the drawings.

DESCRIPTION OF IMPLEMENTATIONS

To make the objectives, technical solutions, and advantages of the present application clearer, the following clearly describes the technical solutions of the present application with reference to specific implementations and accompanying drawings of the present specification. Clearly, the described implementations are merely some rather than all of the implementations of the present application. All other implementations obtained by a person of ordinary skill in the art based on the implementations of the present application without creative efforts shall fall within the protection scope of the present application.

In general, when a to-be-authenticated object is verified, the to-be-authenticated object needs to be photographed to obtain a to-be-authenticated electronic object such as a to-be-recognized image. In such cases, if the to-be-authenticated object is an electronic copy forged based on the to-be-authenticated object, for example, a forged electronic certificate, the forged electronic copy needs to be presented physically, for example, displayed on a screen or by printing, so that the to-be-recognized image can be obtained through second-time photographing, and then be input into an authentication system for authentication. According to the image recognition method, apparatus, and device, and the authentication method, apparatus, and device provided in the implementations of the present specification, in full consideration of the characteristic that the forged electronic copy needs to be displayed on a screen or by printing before it can be used for authentication, such a type of to-be-recognized image obtained through second-time photographing of the forged electronic copy can be recognized, thereby effectively preventing the forged electronic certificate from being used in the authentication process.

For example, the user needs to hold the original identity card for photographing and authentication, or the user needs to participate in a video talk for authentication. Such authentication method needs manual intervention and hardly satisfies application scenarios with a large business volume. Therefore, verifying electronic objects of to-be-authenticated objects has appeared gradually. For example, the user needs to photograph the identity card and upload the obtained identity card image. However, during remote automatic authentication, it is usually rather difficult to recognize the photographed image (i.e., the photographed copy), or accuracy of the recognition is not high. As a result, lawbreakers can handle these remote businesses by photographing forged electronic certificates. The forged electronic certificates are physical certificates that are digitized through photographing or scanning, and then the information on the obtained electronic certificate images is tampered with, for example, using the Photoshop (PS) software. Due to their characteristics of easy acquisition of the forging target, low costs of counterfeiting, easy acquisition of counterfeiting tools, and realistic effects, the forged electronic certificates often appear in the process of remote certificate authentication, posing a serious threat to the security of remote businesses.

Figure 1:
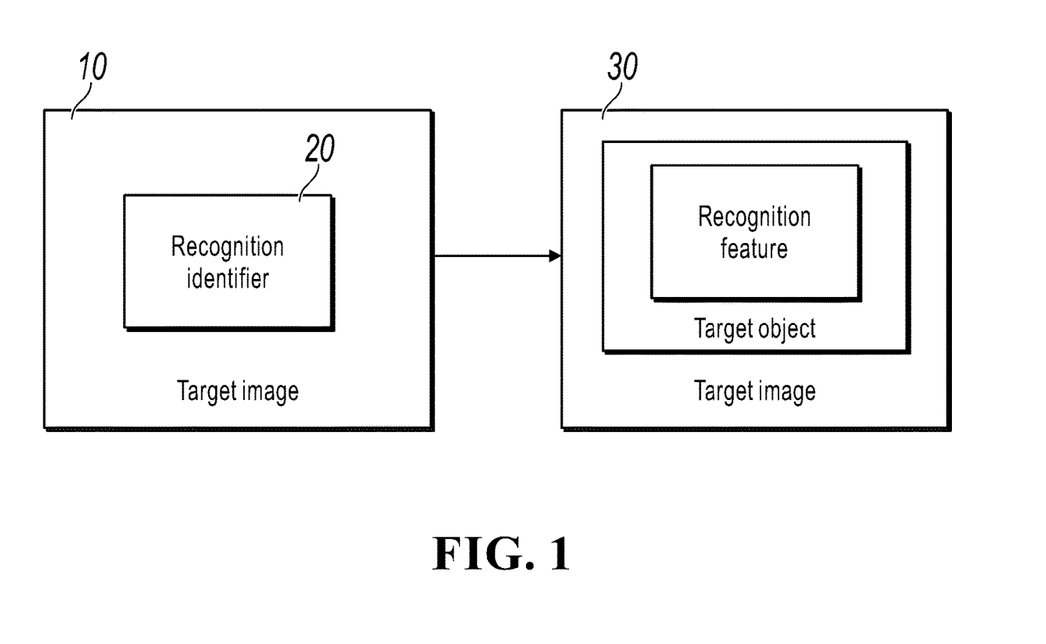
FIG. 1 is a schematic diagram illustrating an application of an image recognition method, according to an implementation of the present specification.

A schematic diagram illustrating an application of an image recognition process in an implementation of the present specification can be shown in FIG. 1, including a to-be-recognized target object 10, such as an identity card, a recognition identifier 20 mapped onto the target object, such as a two-dimensional code, and a target image 30 obtained based on the target object 10 and the recognition identifier 20.

During recognition, the target image 30 is obtained based on the target object 10 that the recognition identifier 20 is mapped onto. The target image 30 has a recognition feature that is formed based on the recognition identifier 20. After the target image 30 is obtained, the target image 30 is recognized based on a predetermined mapping relationship and the recognition feature, and then the attribute of the target object corresponding to the target image 30 is determined.

During specific implementation, the mapping of the recognition identifier 20 and the acquisition, recognition, and determining of the target image 30 can be performed by the same entity or by different entities.

When the image recognition method provided in the implementation of the present specification is performed by the same entity, for example, by a terminal, the process is as follows:

The terminal maps the recognition identifier 20 onto the recognition object 10, acquires the target image 30, recognizes the target image 30, and determines the attribute of the target object corresponding to the target image 30.

When the image recognition method provided in the implementation of the present specification is performed by different entities, for example, jointly by a terminal and a server, the process is as follows:

The terminal maps the recognition identifier 20 onto the recognition object 10, acquires the target image 30, and sends the target image 30 to the server for recognition. The server sends a recognition result to the terminal to determine the attribute of the target object corresponding to the target image 30.

The previous joint execution process can also be as follows: A first terminal maps the recognition identifier 20 onto the recognition object 10, and a second terminal acquires the target image 30 and sends the target image 30 to the server for recognition. The server sends a recognition result to the second terminal to determine the attribute of the target object corresponding to the target image 30.

Terminals include terminal devices that can run software, including but not limited to computers, tablet computers, mobile phones, bank client devices, etc.

The overall idea of the image recognition method provided in the implementation of the present specification is as follows: In consideration of the characteristic that the forged electronic copy needs to be displayed on a screen or by printing so that the presented forged electronic copy has a different surface material from an original certificate, the recognition identifier can be mapped onto the target object. Because the original certificate has a different surface material from the presented forged electronic copy, a difference will be generated when the recognition identifier is displayed on the target object. Then, when the target image corresponding to the target object that carries the recognition identifier is obtained, the recognition identifier can form a corresponding recognition feature on the target image, for example, the recognition feature can include the feature that is formed based on the difference generated by the recognition identifier on the target object. As such, the recognition feature is actively added to the recognition process. Finally, the attribute of the target object corresponding to the target image is determined based on the trained mapping relationship and the recognition feature actively added by using the difference. For example, the target image can be obtained based on the original certificate, or can be obtained based on the displayed forged electronic copy, thereby effectively improving the accuracy of recognizing the target image.

According to the image recognition method provided in the implementations of the present specification, the target image of the target object is obtained, where before the target image is obtained, the recognition identifier is mapped onto the target object, and the recognition identifier is used to form the corresponding recognition feature in the target image. As such, a difference generated by the recognition identifier on different types of target objects is fully used to form the recognition feature that can be recognized on the target image, providing abundant recognition information for later recognition. In addition, the recognition identifier is set through mapping, so as to prevent damage to the target object. Then, the attribute of the target object corresponding to the target image is recognized based on the predetermined mapping relationship and the recognition feature, and recognition and determining are performed based on the recognition feature, thereby effectively improving the recognition accuracy. In such recognition process, by mapping the recognition identifier onto the target object, the easily recognizable feature is actively added to the recognition process, and the image is recognized based on the newly added recognition feature, thereby improving the accuracy and the recognition efficiency, and preventing irrelevant features from interfering with the recognition process and the recognition result.

The previous application scenarios are shown only for ease of understanding the present application, and the implementations of the present specification are not limited in such respect. On the contrary, the implementations of the present specification can be applied to any applicable scenario.

The following describes in detail the image recognition method, apparatus, and device, and the authentication method, apparatus, and device in the present specification with reference to the accompanying drawings.

Figure 2:
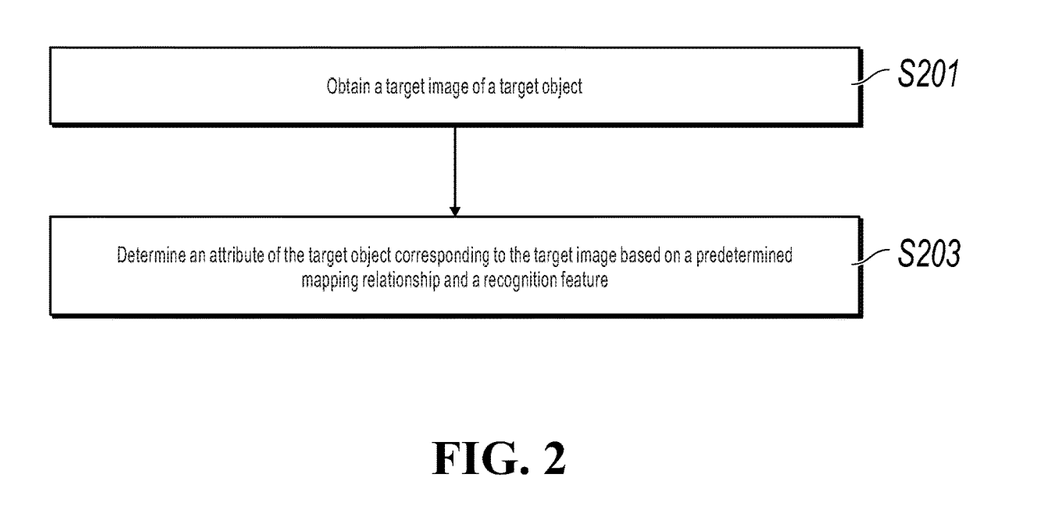
FIG. 2 is a flowchart illustrating an image recognition method, according to an implementation of the present specification.

FIG. 2 is a flowchart illustrating an image recognition method, according to an implementation of the present specification.

As shown in FIG. 2, the image recognition method in the implementation of the present specification includes the following steps:

S201: Obtain a target image of a target object.

Before the target image is obtained, a recognition identifier is mapped onto the target object, and the recognition identifier is used to form a corresponding recognition feature in the target image.

In the implementation of the present specification, the target object includes an object used to generate a target image.

For example, in an application scenario where an identity needs to be recognized, the target object can be a certificate used to represent an identity, such as an identity card, a driver's license, a passport, etc. In such case, the certificate can be the original certificate or can be an electronic copy (e.g., a photographed copy of the certificate) forged based on the original certificate.

For another example, in an application scenario where it is necessary to identify whether a bank card is actually held, the target object can also be bank cards of various forms. In such case, the bank card can be the original bank card, or can be electronic copies (e.g., photographed copies of the bank cards) forged based on the original bank card.

It is worthwhile to note that, the photographed copy is a photographed copy physically presented again, for example, a photographed copy displayed on a screen or a photographed copy displayed by printing.

The recognition identifier includes an identifier that is mapped onto the target object and is used to produce a feature for recognition, for example, the recognition identifier can be a specific pattern.

In the actual operation process, the recognition identifier is mapped onto the surface of the target object. It can be that a light source with the recognition identifier emits light, and when the target object approaches the recognition identifier, the light reflects on the surface of the target object, so that the recognition identifier that can form the recognition feature is mapped onto the surface of the target object.

In such recognition identifier mapping method, the recognition identifier can be adjusted based on the actual need to satisfy a complex actual use demand; the target object can be prevented from damage; and the recognition identifier can be set on the target object simply, quickly, and clearly.

The recognition feature includes a recognizable feature that is formed in the target image and corresponds to the recognition identifier.

Based on different target objects, the target objects used to acquire the target images have different surface materials. Therefore, when the recognition identifier is mapped onto the target object, the recognition identifier will generate a difference on different surfaces due to different surface materials. For example, when the target object is an original identity card, the surface material is an anti-counterfeiting coating. When the target object is a photographed copy of the identity card displayed on the screen, the surface material is a liquid crystal display screen. In such case, the recognition identifier will generate an obvious difference on the surfaces of the two different materials. The recognition features corresponding to the recognition identifier in the obtained target images will also retain these differences, so that the recognition features can be used for recognition based on these differences.

In an example application, for more accurate recognition, the recognition identifier includes a pattern that includes a positioning feature, and the positioning feature is used to position the pattern that includes the positioning feature. The pattern can be quickly positioned by using the positioning feature included in the pattern, that is, the recognition identifier can be quickly positioned based on the positioning feature, and then recognition is performed.

For example, the previous pattern that includes the positioning feature can be a circular pattern, a centrally symmetric polygon pattern, etc.

The pattern that includes the positioning feature is used as the recognition identifier, so that the recognition identifier can be positioned based on the positioning feature, and the recognition feature can be located in a later recognition process, thereby ensuring that the recognition feature can be used for recognition more accurately and quickly.

In the implementation of the present specification, the obtained target image includes the target object and the recognition feature corresponding to the recognition identifier.

In an actual application process, to obtain the target image simply and quickly, the method for obtaining the target image can include acquisition through photographing, for example, photographing the target object and the recognition identifier by using a camera, or shooting a photo or a video and then obtaining one photographed photo or one image in the video as the target image. In addition, the method for obtaining the target image can also include acquisition through scanning, for example, scanning the target object and the recognition identifier by using a scanner to obtain a scanned image as the target image.

Further, the recognition feature in the obtained target image includes any one or more of a color feature, a texture feature, a shape feature, or a spatial relationship feature.

For example, when the target object is an identity card, and when the recognition feature is displayed on the original identity card and a photographed copy of the identity card displayed on the screen or by printing, because of the difference between the surface materials of the original certificate and the photographed copy displayed on the screen or printed on paper, the recognition identifiers mapped onto the original certificate and the photographed copy will generate differences in terms of grey scale, color, texture, outline deformation, and position relative to the identity card. Based on these differences, the recognition identifiers can form corresponding recognition features on the target image.

In an example application, to facilitate operation of the whole recognition process and prevent the use of complex devices, the image recognition method in the implementation of the present specification can be used in a mobile terminal, where the mobile terminal includes a display unit and an image acquisition unit; the step of obtaining the target image of the target object includes the following: obtaining, by the image acquisition unit, the target image; and the step of mapping the recognition identifier onto the target object includes the following: mapping, by the display unit, the recognition identifier presented on the display unit onto the target object, where the image acquisition unit and the display unit are located on the same side of the target object.

In the implementation of the present specification, the mobile terminal can include a mobile phone, a tablet computer, a computer, a bank client, or another mobile device capable of displaying images and performing image acquisition.

The display unit is configured to present the recognition identifier and map the recognition identifier onto the target object.

The recognition identifiers can include randomly generated recognition identifiers such as circular icons, square icons, etc., or can include recognition identifiers having predetermined specific information, such as trademarks, abbreviations, two-dimensional codes, barcodes, numbers, etc.

The presentation of the recognition identifier by the display unit can include displaying the same recognition identifier, such as always displaying the abbreviation of the bank as the recognition identifier, or can include displaying the recognition identifier based on a predetermined display policy, such as displaying different two-dimensional codes in a predetermined period.

The recognition identifier can be displayed in various display methods, thereby flexibly adapting to different application scenarios and better satisfying different setting demands.

The image acquisition unit is configured to acquire the target image based on the target object and the recognition identifier mapped onto the target object.

Specifically, in the process of acquiring the target image by the mobile terminal, the image display unit displays a predetermined recognition identifier and serves as a light source to map the recognition identifier onto the target object. In such case, because the direction in which the image acquisition unit acquires the target image and the direction in which the display unit maps the recognition identifier onto the target object are located on the same side, the image acquisition unit can photograph the target object that the recognition identifier is mapped onto, so as to acquire the target image.

The image acquisition unit and the display unit are located on the same side of the target object, so that the setting of the recognition identifier and the acquisition of the target image can be completed in one mobile terminal, reducing the use of redundant devices, and facilitating and easing the operation.

In an example application, to make the authentication process more convenient and flexible, the mobile terminal includes a mobile intelligent device, the display unit includes a screen, and the image acquisition unit includes a front-facing camera; the obtaining, by the image acquisition unit, the target image includes the following: obtaining the target image by using the front-facing camera; and the mapping, by the display unit, the recognition identifier presented on the display unit onto the target object includes the following: mapping, by using the screen, the recognition identifier displayed on the screen onto the target object.

In the implementation of the present specification, the mobile intelligent terminal can include a mobile phone, a tablet computer, or another mobile intelligent device capable of displaying images and performing image acquisition.

Figure 3:
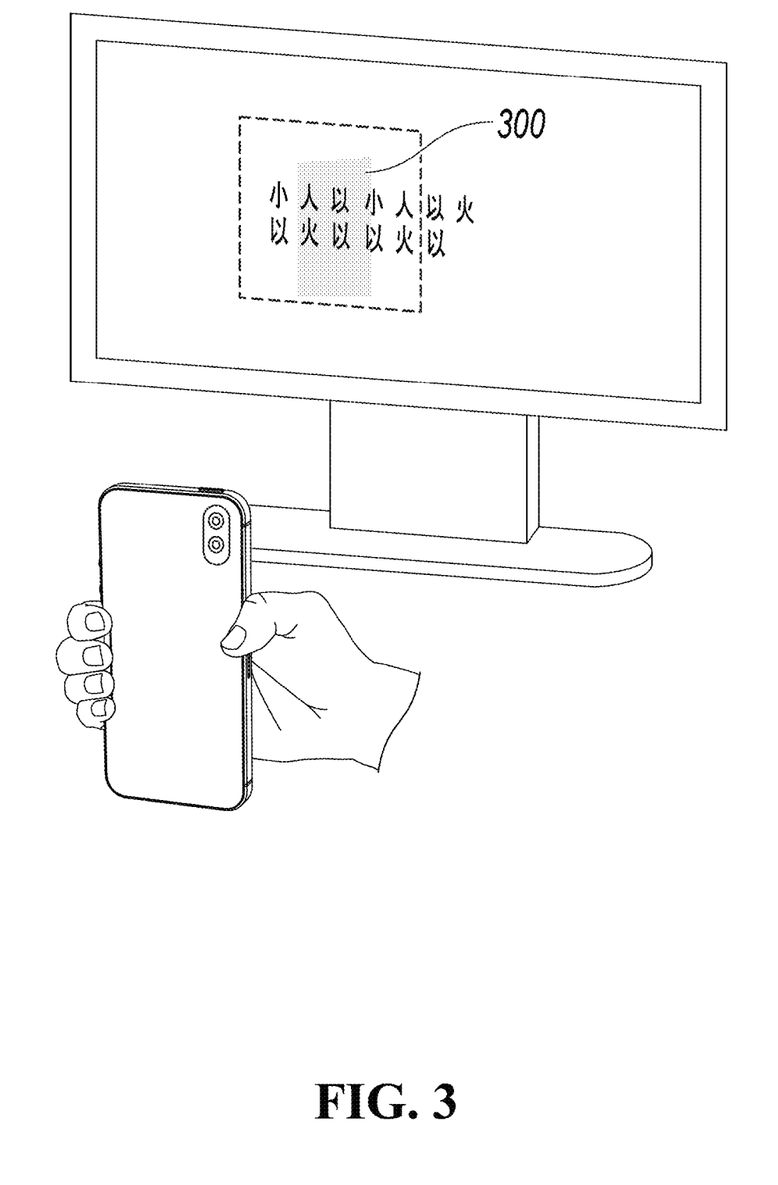
FIG. 3 is a schematic diagram of acquiring an identity card image by using a mobile phone in an image recognition method, according to an implementation of the present specification.

FIG. 3 is a schematic diagram of acquiring an identity card image by using a mobile phone in an image recognition method, according to an implementation of the present specification.

For example, the mobile phone is used to acquire the target image for the identity card. The display unit is a mobile phone screen, the image acquisition unit is a front-facing camera of the mobile phone, the target object is a photographed copy of the identity card (i.e., the identity card displayed on the screen), and the recognition identifier is a two-dimensional code 300. As shown in FIG. 3, the front-facing camera of the mobile phone and the mobile phone screen are located on the same side of the identity card. In such case, the mobile phone can be used to photograph the identity card displayed on the screen, and the two-dimensional code 300 displayed on the mobile phone screen is mapped onto the surface of the photographed copy of the identity card, so that the two-dimensional code 300 appears on the surface of the photographed copy of the identity card (as shown in the dashed-line block in FIG. 3). Then, the front-facing camera of the mobile phone is used to photograph the photographed copy of the identity card with the two-dimensional code 300 on the surface, so as to obtain a photo that includes the photographed copy of the identity card and the two-dimensional code 300 as the target image.

It is worthwhile to note that, when the target object is an original identity card, the process of acquiring the identity card image by using the mobile phone is the same as the previous process. Details are omitted here for simplicity.

The mapping of the recognition identifier and the acquisition of the target image can be completed by using the mobile phone, thereby improving the applicability of the image recognition method provided in the implementation of the present specification. Further, the actual demands of various application scenarios can be satisfied through cooperation with the applications in the mobile phone.

In an example application, to ensure that a valid target image can be accurately obtained, before the target image is obtained, the method further includes detecting the target object; and the obtaining the target image of the target object includes the following: correspondingly obtaining the target image of the target object based on a detection result.

Before the target image is obtained, the detection of the target object can include detecting whether the type of the target object satisfies the predetermined recognition demands, for example, when the recognition demand is the identity card, detecting whether the target object is an identity card. The detection of the target object can also include detecting whether the target object is in a predetermined position, for example, detecting whether an edge of the target object exceeds the acquisition area.

For example, when detecting whether the type of the target object satisfies the predetermined recognition demands, the detection of the target object can include photographing the target object to obtain a photo of the target object, and detecting whether there is a type of a target certificate that satisfies the predetermined recognition demands on the photo. The type of the target object can be different types of certificates such as an identity card, a driver's license, etc., or can be a bank card.

The shot photo of the target object can be detected by using a predetermined target object type detection model, to determine whether the type of the target object in the photo satisfies the predetermined recognition demands. For example, during recognition based on a neural network model, such as the single shot multibox detector (SSD) model in a convolutional neural network model, the SSD model is trained by using multiple labeled images including the type of the predetermined target object as the input for training the SSD model, and then the trained SSD model is used to detect the shot photos of the target object, so as to determine whether the type of the target object satisfies the predetermined recognition demands.

The type of the target object is detected in advance, thereby preventing a recognition failure caused by using an incorrect target object in a later recognition process, and improving the recognition efficiency.

For another example, when detecting whether the target object is in a predetermined position, the target object can be photographed to obtain a photo of the target object, and detecting whether the target object in the photo is in the predetermined position.

When detecting the target object in the photo, a neural network model, such as an SSD model in the convolutional neural network model can also be used to recognize the target object in the photo, and determine whether the edges of the target object are completely within the photo. The SSD model is trained by using multiple labeled photos including the target object in the predetermined position as the input for training the SSD model, and then the trained SSD model is used to detect the target object in the photo, so as to determine whether the target object is in the predetermined position.

Because it is detected whether the target object is in the predetermined position, the obtained target image can include a complete target object, that is, the target image includes all parts of the target object, thereby preventing omission and impact on later recognition.

It is worthwhile to note that, the detection of the target object can be performed before the recognition identifier is mapped onto the target object, that is, no recognition identifier is mapped onto the target object to be detected. The detection of the target object can also be performed after the recognition identifier is mapped onto the target object, that is, the recognition identifier has been mapped onto the target object to be detected.

When the target object is detected before the recognition identifier is mapped, the photos used to train the SSD model include the target object and do not include the recognition identifier.

When the target object is detected after the recognition identifier is mapped, the photos used to train the SSD model include both the target object and the recognition identifier.

In an example application, when the target object is detected after the recognition identifier is mapped, the detection of the target object can include detecting the target object based on the recognition identifier when the recognition identifier is mapped onto the target object.

For example, when detecting whether the target object is in a predetermined position, the detecting the target object based on the recognition identifier can include positioning based on the recognition identifier, and detecting whether the target object is in the predetermined position based on the relative position between the recognition identifier and the target object.

In an example application, to help determine the detection result and improve the detection efficiency, a detection indicator is output based on the detection result during the detection of the target object.

The corresponding detection indicator can be sent as prompt information based on the detection result, so as to understand the detection status and perform later operations based on the detection indicator.

For example, when a qualified target certificate is detected, a qualification indicator is sent to prompt entry to a later operation. When no qualified target certificate is detected, an unqualification indicator is sent to indicate that an error occurs on the target object and the target object needs to be adjusted.

It is worthwhile to note that, the prompt information can be presented in various ways, for example, can be presented by using light of different colors, through vibration at different frequencies, or by using different sounds.

In an example application, to adapt to complex detection situations in actual use, and output the detection indicator clearly and accurately, the detection indicator includes a voice broadcast and/or a light indicator.

For example, when the detection indicator is a voice broadcast, if a qualified target object is detected, a prompt "the target certificate has been detected" is given in the form of a voice broadcast. If no qualified target object is detected, the detection is performed cyclically until timeout, and a prompt "no target certificate is detected" is cyclically given in the form of a voice broadcast in the cyclic detection process. In the case of timeout, a prompt "the target certificate fails to be detected due to timeout and exit" is given in the form of a voice broadcast. Failure to detect the qualified target object can include the following: the type of the target object does not satisfy the predetermined recognition demands, or the target object is not in the predetermined position.

The detection indicator is output by using a voice prompt, so that the whole detection indicator can be output clearly, thereby improving the simplicity of the operation process.

When the detection indicator is light, different detection statuses can be prompted by using light of different colors, or through light flashing at different frequencies.

Further, multiple methods for obtaining the target image are predetermined. After the detection result is obtained, the correspondingly obtaining the target image of the target object based on the detection result can include obtaining the target image based on the acquisition method corresponding to the detection result. For example, the target image can be automatically photographed after the qualified target object is detected, or the target image can be photographed based on an input photographing instruction after the qualified target object is detected, or the target image can be photographed based on an input photographing instruction after the unqualified target object is detected.

In an example application, to ensure that the target image is obtained based on the qualified target object, the obtaining the target image of the target object includes obtaining the target image within a predetermined acquisition time when the qualified target object is detected.

To ensure the accuracy of the obtained target image, the target image should be obtained based on the qualified target object in a timely way when the qualified target object is detected. For example, when the trained SSD model determines that the type of the target object satisfies the predetermined recognition demands, the target image can be obtained within 1 s after the determining, thereby preventing a detection result failure due to an excessively long interval, preventing failure to use the obtained target image, and preventing impact on later recognition.

It is worthwhile to note that, in the implementation of the present specification, the acquisition time can be predetermined based on a specific application scenario, which is not limited here.

The target image is automatically acquired based on the detection result of the target object, thereby ensuring the effectiveness of the obtained target image, improving the recognition efficiency, and preventing redundant operations from interfering with the recognition process.

S203: Determine the attribute of the target object corresponding to the target image based on the predetermined mapping relationship and the recognition feature.

The attribute of the target object can include the type of the target object.

For example, the target object is an identity certificate as a previously described example. When the target object is the original certificate, the attribute of the target object is an original. When the target object is an electronic copy forged based on the original certificate, the attribute of the target object is a photographed copy.

The predetermined mapping relationship includes the corresponding relationship between the recognition feature and the attribute of the target object, and is used to recognize the target image, and determine the attribute of the target object corresponding to the target image based on the recognition feature, that is, determine whether the target image is an original or a photographed copy. The predetermined mapping relationship can be obtained based on a pre-trained photographing recognition model that is implemented based on a binary classification deep learning network. Two classifications include a photographed copy and an original. The photographing recognition model is trained by using 500 images that are labeled with classification and include the recognition feature for each classification as input. During recognition, the object image obtained in S203 is input and recognized by using the photographing recognition model, and then the attribute of the target object is determined based on the recognition result.

In the implementation of the present specification, the target image of the target object is obtained, where before the target image is obtained, the recognition identifier is mapped onto the target object, and the recognition identifier is used to form the corresponding recognition feature in the target image. As such, a difference generated by the recognition identifier on the target object is used to form the recognition feature that can be used for recognition on the target image, so that the recognition feature generated based on the difference is actively added to the recognition process. Then, the attribute of the target object corresponding to the target image is determined based on the predetermined mapping relationship and the recognition feature, where the mapping relationship includes the corresponding relationship between the recognition feature and the attribute of the target object. As such, accuracy of recognizing the target image is effectively improved.

Implementation 2

In implementation 2, for a method the same as the method in implementation 1, the same notation is used and the same description is omitted.

Figure 4:
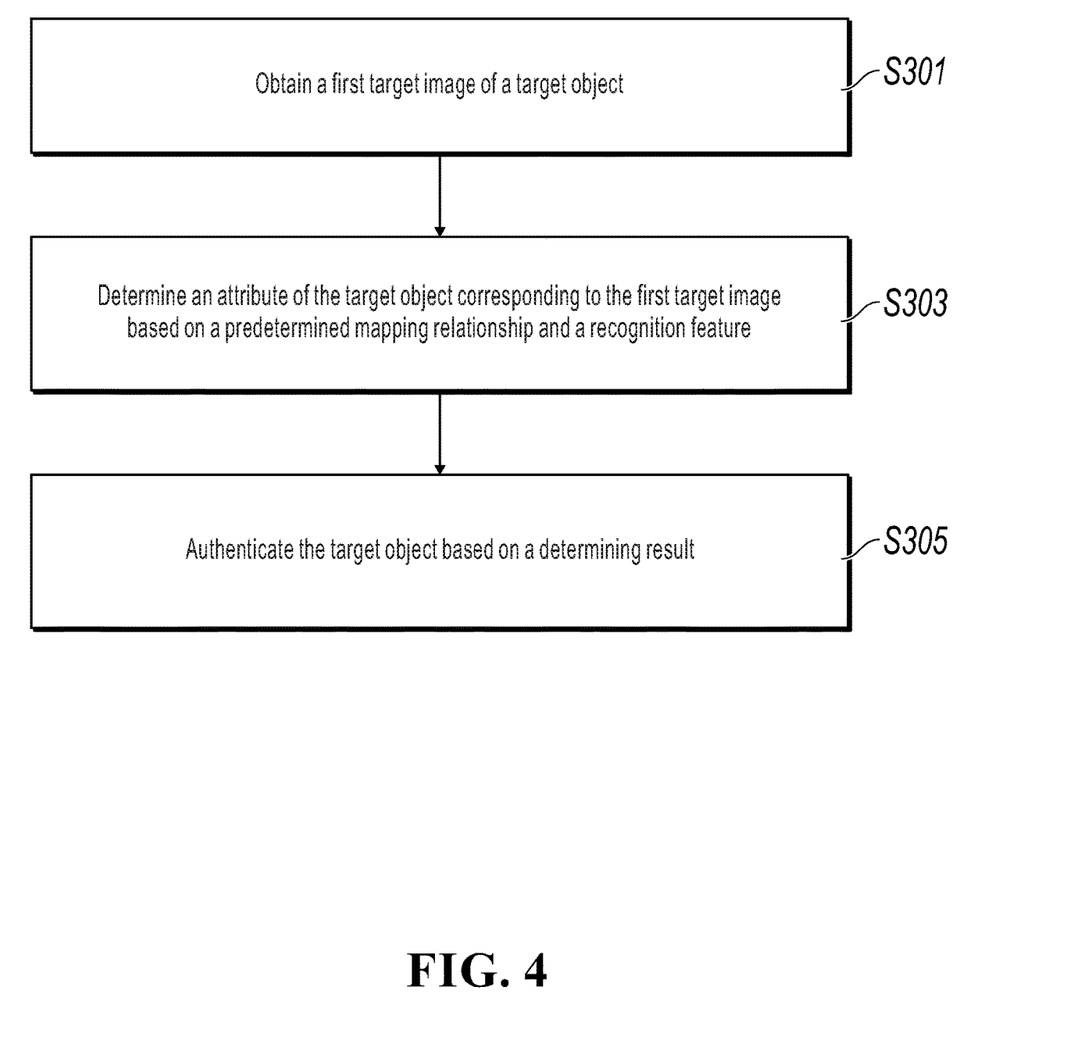
FIG. 4 is a flowchart illustrating an authentication method, according to an implementation of the present specification.

FIG. 4 is a flowchart illustrating an authentication method, according to an implementation of the present specification.

As shown in FIG. 4, the authentication method in the implementation of the present specification includes the following steps:

S301: Obtain a first target image of a target object.

Before the first target image is obtained, a recognition identifier is mapped onto the target object, and the recognition identifier is used to form a corresponding recognition feature in the first target image.

S303: Determine an attribute of the target object corresponding to the first target image based on a predetermined mapping relationship and the recognition feature.

The mapping relationship includes a corresponding relationship between the recognition feature and the attribute of the target object.

S305: Authenticate the target object based on a determining result.

When it is determined in S303 that the first target image comes from the original certificate, the target object is authenticated to determine the authenticity of the target object.

For example, the authentication of the target object can include extracting text information on the target object, comparing the text information with the pre-stored information, and determining the authenticity of the target object. The pre-stored information can include pre-filled information or can include information pre-stored in a third-party system.

In an example application, to ensure the accuracy of the authentication process, the method further includes the following: obtaining a second target image of the target object within a predetermined time period after the first target image is obtained, where the second target image is an image for which no recognition identifier is mapped onto the target object; and the authenticating the target object includes the following: performing data processing on the second target image based on a predetermined data processing policy; and determining authenticity of the target object based on a data processing result.

In the implementation of the present specification, the target object in the second target image is a target object onto which no recognition identifier is mapped, so as to prevent impact of the recognition identifier on the target object authentication. Therefore, the second target image can be obtained after S303. In such case, the recognition identifier on the target object is first removed, and then the second target image is obtained. The second target image can also be obtained before S303, for example, the second target image is obtained after a qualified target object is detected. In such case, the detection of the target object is performed based on a target object onto which no recognition identifier is mapped.

For example, the second target image can be obtained within a predetermined time period after it is determined that the first target image comes from an original. For example, when it is determined in S303 that the first target image comes from an original, the target image can be obtained within 0.5 s after the determining.

Such method for obtaining the second target image prevents a recognition result failure due to an excessively long interval, and ensures the accuracy of the second target image. In addition, the second target image is obtained based on the recognition result of the first target image, and the second target image is obtained depending on the authentication demands, and is a resource that needs to be used in the later authentication process. As such, effective utilization of the resource is ensured.

Further, when authenticating the target object, the data processing policy can include processing the second target image that includes the target object by using the optical character recognition (OCR) technology, so as to recognize and extract the information on the second target image. For example, when the target object is an identity card, information such as a name, a birthday, and a validity period of the certificate on the identity card is extracted, and then authenticity of the target object is determined based on the extracted information. For example, the information extracted from the identity card is sent to the public security system, to determine the authenticity of the information, and then determine the authenticity of the identity card.

The following describes the authentication method provided in the present specification by using an example in which an authentication application in a mobile phone determines authenticity of an identity card.

Figure 5:
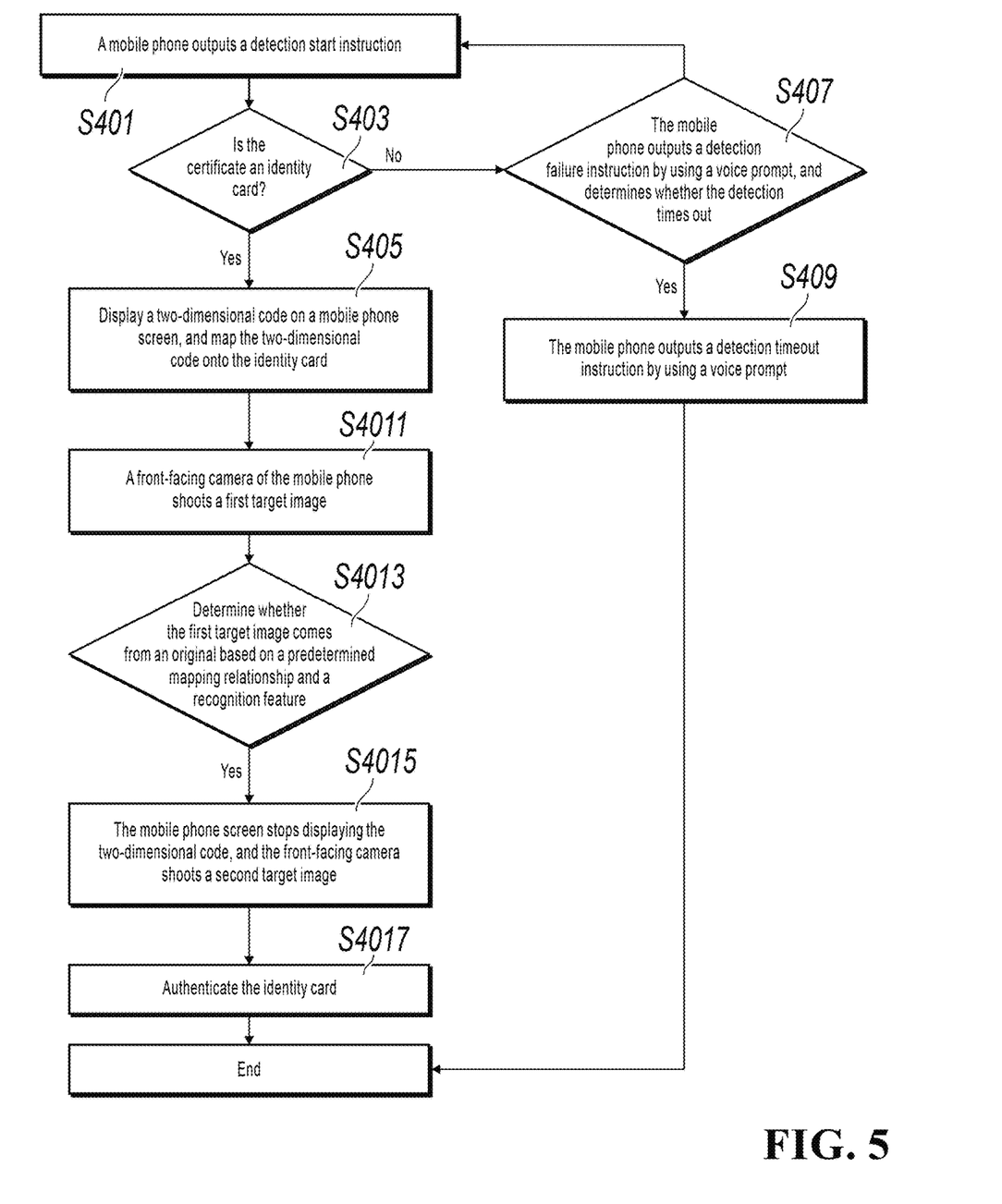
FIG. 5 is a flowchart illustrating an authentication method, according to an implementation of the present specification.

FIG. 5 is a flowchart illustrating an authentication method, according to an implementation of the present specification.

As shown in FIG. 5, the authentication method in the implementation of the present specification includes the following steps:

S401: The mobile phone outputs a detection start instruction and then performs S403.

The detection start instruction can include prompting a user to place a to-be-authenticated certificate in an acquisition area.

The detection start instruction can be output in the form of a voice broadcast, or by using display prompt information on the mobile phone screen.

S403: Determine whether the certificate is an identity card; if yes, perform S405; otherwise, perform S407.

In the implementation of the present specification, the certificate is photographed, and a trained SSD model is used to detect the photographed certificate photo, to determine whether the certificate is an identity card.

S405: Display a two-dimensional code on the mobile phone screen, map the two-dimensional code onto the identity card, and then perform S4011.

S407: The mobile phone outputs a detection failure instruction by using a voice prompt, and determines whether the detection times out; if yes, performs S409; otherwise, performs S401.

S409: The mobile phone outputs a detection timeout instruction by using a voice prompt, and then the process ends.

S4011: A front-facing camera of the mobile phone shoots a first target image, and then performs S4013.

The first target image includes the identity card and a recognition feature generated based on a two-dimensional code mapped onto the identity card.

S4013: Determine an attribute of the target object corresponding to the first target image based on a predetermined mapping relationship and the recognition feature. If the attribute of the target object corresponding to the first target image is an original identity card, S4015 is performed.

In the implementation of the present specification, a trained photographing recognition model is used to recognize the first target image, to determine whether the identity card is an original.

S4015: The mobile phone screen stops displaying the two-dimensional code, and the front-facing camera shoots a second target image, and then performs S4017.

The second target image includes only the identity card.

S4017: Authenticate the identity card. Then the process ends.

In the implementation of the present specification, the information such as a name, a birthday, and a validity period of the certificate on the identity card is extracted by using the OCR technology, and the information is sent to the public security system to determine the authenticity of the identity card. If the information is authentic, the authentication succeeds. If the information is false, the authentication fails.

Figure 6:
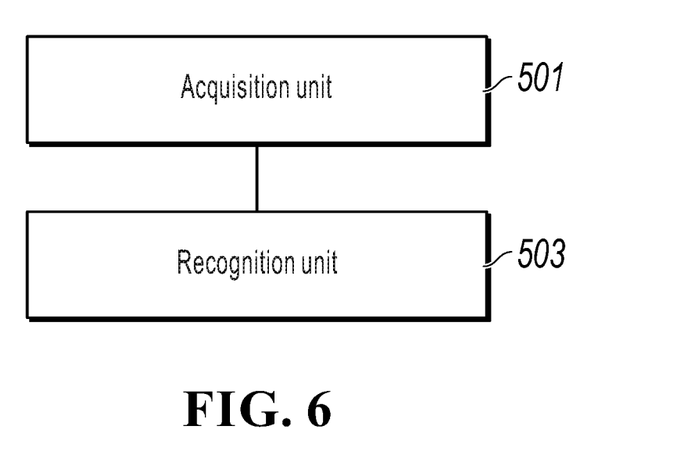
FIG. 6 is a schematic structural diagram illustrating an image recognition apparatus, according to an implementation of the present specification.

FIG. 6 is a schematic structural diagram illustrating an image recognition apparatus, according to an implementation of the present specification.

Based on the same application idea, the image recognition apparatus described in the implementation of the present specification can include the following: an acquisition unit 501, configured to obtain a target image of a target object, where before the target image is obtained, a recognition identifier is mapped onto the target object, and where the recognition identifier is used to form a corresponding recognition feature in the target image; and a recognition unit 503, configured to determine an attribute of the target object corresponding to the target image based on a predetermined mapping relationship and the recognition feature, where the mapping relationship includes a corresponding relationship between the recognition feature and the attribute of the target object.

Optionally, before the target image is obtained, the apparatus further includes a detection unit, configured to detect the target object; and the obtaining a target image of a target object includes the following: correspondingly obtaining the target image of the target object based on a detection result.

Optionally, the detecting the target object includes the following: detecting the target object based on the recognition identifier when the recognition identifier is mapped onto the target object.

Optionally, in the step of detecting the target object, the apparatus further includes an output unit, configured to output a detection indicator based on a detection result.

Optionally, the correspondingly obtaining the target image of the target object based on a detection result includes the following: obtaining the target image within a predetermined acquisition time when the qualified target object is detected.

Optionally, the apparatus is used in a mobile terminal, and the mobile terminal includes a display unit and an image acquisition unit; the step of obtaining a target image of a target object includes the following: obtaining, by the image acquisition unit, the target image; and the step of mapping the recognition identifier onto the target object includes the following: mapping, by the display unit, the recognition identifier presented on the display unit onto the target object, where the image acquisition unit and the display unit are located on the same side of the target object.

The previous at least one technical solution used in the implementations of the present specification can achieve the following beneficial effects: The target image of the target object is obtained, where before the target image is obtained, the recognition identifier is mapped onto the target object, and the recognition identifier is used to form the corresponding recognition feature in the target image. As such, a difference generated by the recognition identifier on the target object is used to form the recognition feature that can be used for recognition on the target image, so that the recognition feature generated based on the difference is actively added to the recognition process. Then, the attribute of the target object corresponding to the target image is determined based on the predetermined mapping relationship and the recognition feature, where the mapping relationship includes the corresponding relationship between the recognition feature and the attribute of the target object. As such, accuracy of recognizing the target image is effectively improved.

Based on the same inventive concept, an implementation of the present specification further provides an electronic device, including: at least one processor; and at least one memory, where the memory stores a program, and the at least one processor is configured to perform the following steps: obtaining a target image of a target object, where before the target image is obtained, a recognition identifier is mapped onto the target object, and where the recognition identifier is used to form a corresponding recognition feature in the target image; and determining an attribute of the target object corresponding to the target image based on a predetermined mapping relationship and the recognition feature, where the mapping relationship includes a corresponding relationship between the recognition feature and the attribute of the target object.

For other functions of the processor, references can be made to the content described in the previous implementation, and details are omitted here for simplicity.

Based on the same inventive concept, an implementation of the present specification further provides a computer readable storage medium, where the computer readable storage medium includes a program used in conjunction with an electronic device, and the program can be executed by a processor to perform the following steps: obtaining a target image of a target object, where before the target image is obtained, a recognition identifier is mapped onto the target object, and where the recognition identifier is used to form a corresponding recognition feature in the target image; and determining an attribute of the target object corresponding to the target image based on a predetermined mapping relationship and the recognition feature, where the mapping relationship includes a corresponding relationship between the recognition feature and the attribute of the target object.

Implementation 4

Figure 7:
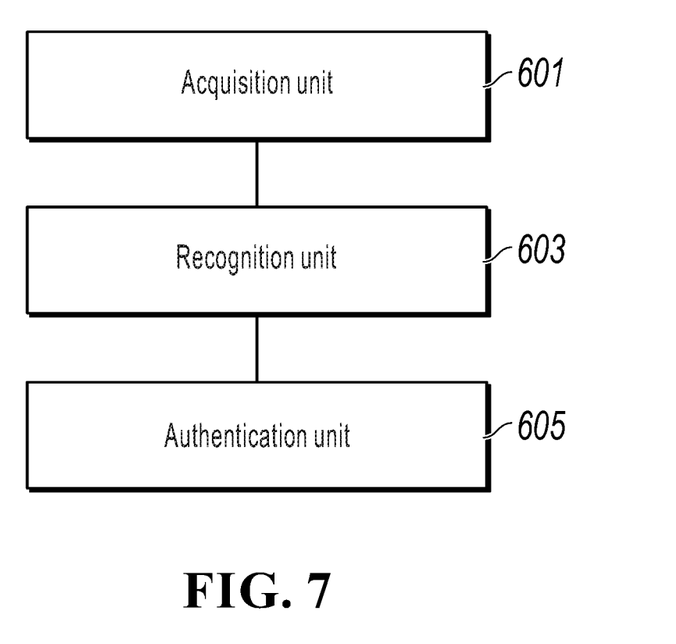
FIG. 7 is a schematic structural diagram illustrating an authentication apparatus, according to an implementation of the present specification.

FIG. 7 is a schematic structural diagram illustrating an authentication apparatus, according to an implementation of the present specification.

Based on the same application idea, the authentication apparatus described in the implementation of the present specification can include the following: an acquisition unit 601, configured to obtain a first target image of a target object, where before the target image is obtained, a recognition identifier is mapped onto the target object, and where the recognition identifier is used to form a corresponding recognition feature in the first target image; a recognition unit 603, configured to determine an attribute of the target object corresponding to the first target image based on a predetermined mapping relationship and the recognition feature, where the mapping relationship includes a corresponding relationship between the recognition feature and the attribute of the target object; and an authentication unit 605, configured to authenticate the target object based on a determining result.

Optionally, the apparatus is further configured to: obtain a second target image of the target object within a predetermined time period after the first target image is obtained, where the second target image is an image for which no recognition identifier is mapped onto the target object; and the authenticating the target object includes the following: performing data processing on the second target image based on a predetermined data processing policy; and determining authenticity of the target object based on a data processing result.

Based on the same inventive concept, an implementation of the present specification further provides an electronic device, including: at least one processor; and at least one memory, where the memory stores a program, and the at least one processor is configured to perform the following steps: obtaining a first target image of a target object, where before the target image is obtained, a recognition identifier is mapped onto the target object, and where the recognition identifier is used to form a corresponding recognition feature in the first target image; determining an attribute of the target object corresponding to the first target image based on a predetermined mapping relationship and the recognition feature, where the mapping relationship includes a corresponding relationship between the recognition feature and the attribute of the target object; and authenticating the target object based on a determining result.

For other functions of the processor, references can be made to the content described in the previous implementation, and details are omitted here for simplicity.

Based on the same inventive concept, an implementation of the present specification further provides a computer readable storage medium, where the computer readable storage medium includes a program used in conjunction with an electronic device, and the program can be executed by a processor to perform the following steps: obtaining a first target image of a target object, where before the target image is obtained, a recognition identifier is mapped onto the target object, and where the recognition identifier is used to form a corresponding recognition feature in the first target image; determining an attribute of the target object corresponding to the first target image based on a predetermined mapping relationship and the recognition feature, where the mapping relationship includes a corresponding relationship between the recognition feature and the attribute of the target object; and authenticating the target object based on a determining result.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the previous apparatus is described by dividing functions into various units. Certainly, when the present application is implemented, a function of each unit can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the implementations of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of executable computer instructions executed by a computer, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The implementations in the present specification are described in a progressive way. For same or similar parts of the implementations, references can be made to the implementations mutually. Each implementation focuses on a difference from other implementations. Particularly, a system implementation is similar to a method implementation, and therefore is described briefly. For related parts, references can be made to related descriptions in the method implementation.

The previous descriptions are merely implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
obtaining a target image of a target object, wherein the target image comprises a recognition feature formed from a recognition identifier mapped onto the target object, wherein the recognition identifier comprises an optical image projected onto the target object;
determining, from the target image, an attribute resulting from the projection of the optical image onto the target object, wherein a the attribute is mapped to the recognition feature; and
authenticating the target object based on a determining result, wherein the determining result comprises the attribute and extracted information from the target object.

2. The computer-implemented method of claim 1, further comprising detecting the target object before obtaining the target image, wherein detecting the target object comprises extracting a position of the target object in reference to an acquisition field of an image capture device, and
wherein using the position of the target object to obtain the target image of the target object.

3. The computer-implemented method of claim 2, wherein detecting the target object further comprises detecting the recognition identifier.

4. The computer-implemented method of claim 2, wherein the method further comprises outputting a detection indicator based on detecting the target object.

5. The computer-implemented method of claim 4, wherein the detection indicator comprises a voice broadcast or a light indicator.

6. The computer-implemented method of claim 2, wherein obtaining the target image occurs within a predetermined acquisition time upon detection of a qualified target object.

7. The computer-implemented method of claim 1, wherein the recognition identifier comprises a pattern, and wherein the pattern comprises a positioning feature that maps the pattern onto the target object.

8. The computer-implemented method of claim 1, wherein obtaining the target image comprises obtaining the target image by an image detector of a mobile electronic communication device, and
wherein mapping the recognition identifier onto the target object comprises: presenting the recognition identifier on a display of the mobile electronic communication device, and mapping the recognition identifier on the display onto the target object, wherein the image detector and the display are located in front of a same side of the target object.

9. The computer-implemented method of claim 8, wherein the mobile electronic communication device comprises a smartphone, the display comprises a screen of the smartphone, and the image detector comprises a front-facing camera of the smartphone,
wherein obtaining the target image comprises capturing the target image with the front-facing camera, and
wherein mapping the recognition identifier onto the target object comprises using illumination from the screen of the smartphone to map the recognition identifier displayed on the screen of the smartphone onto the target object.

10. The computer-implemented method of claim 1, wherein the recognition feature comprises any one or more of a color feature, a texture feature, a shape feature, or a spatial relationship feature.

11. A non-transitory, computer-readable medium storing one or more instructions executable by a computer system to perform operations comprising:
obtaining a target image of a target object, wherein the target image comprises a recognition feature formed from a recognition identifier mapped onto the target object, wherein the recognition identifier comprises an optical image projected onto the target object;
determining, from the target image, an attribute resulting from the projection of the optical image onto the target object, wherein a the attribute is mapped to the recognition feature; and
authenticating the target object based on a determining result, wherein the determining result comprises the attribute and extracted information from the target object.

12. The non-transitory, computer-readable medium of claim 11, further comprising detecting the target object before obtaining the target image, wherein detecting the target object comprises extracting a position of the target object in reference to an acquisition field of an image capture device, and
wherein using the position of the target object to obtain the target image of the target object.

13. The non-transitory, computer-readable medium of claim 12, wherein detecting the target object further comprises detecting the recognition identifier.

14. The non-transitory, computer-readable medium of claim 12, wherein the operations further comprise outputting a detection indicator based on detecting the target object.

15. The non-transitory, computer-readable medium of claim 14, wherein the detection indicator comprises a voice broadcast or a light indicator.

16. The non-transitory, computer-readable medium of claim 12, wherein obtaining the target image occurs within a predetermined acquisition time upon detection of a qualified target object.

17. The non-transitory, computer-readable medium of claim 11, wherein the recognition identifier comprises a pattern, and wherein the pattern comprises a positioning feature that maps the pattern onto the target object.

18. The non-transitory, computer-readable medium of claim 11, wherein obtaining the target image comprises obtaining the target image by an image detector of a mobile electronic communication device, and
wherein mapping the recognition identifier onto the target object comprises: presenting the recognition identifier on a display of the mobile electronic communication device, and
mapping the recognition identifier on the display onto the target object, wherein the image detector and the display are located in front of a same side of the target object.

19. The non-transitory, computer-readable medium of claim 18, wherein the mobile electronic communication device comprises a smartphone, the display comprises a screen of the smartphone, and the image detector comprises a front-facing camera of the smartphone,
wherein obtaining the target image comprises capturing the target image with the front-facing camera, and
wherein mapping the recognition identifier onto the target object comprises using illumination from the screen of the smartphone to map the recognition identifier displayed on the screen of the smartphone onto the target object.

20. The non-transitory, computer-readable medium of claim 11, wherein the recognition feature comprises any one or more of a color feature, a texture feature, a shape feature, or a spatial relationship feature.

21. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a target image of a target object, wherein the target image comprises a recognition feature formed from a recognition identifier mapped onto the target object, wherein the recognition identifier comprises an optical image projected onto the target object;
determining, from the target image, an attribute resulting from the projection of the optical image onto the target object, wherein a the attribute is mapped to the recognition feature; and
authenticating the target object based on a determining result, wherein the determining result comprises the attribute and extracted information from the target object.

22. The computer-implemented system of claim 21, further comprising detecting the target object before obtaining the target image, wherein detecting the target object comprises extracting a position of the target object in reference to an acquisition field of an image capture device, and
wherein using the position of the target object to obtain the target image of the target object.

23. The computer-implemented system of claim 22, wherein detecting the target object further comprises detecting the recognition identifier.

24. The computer-implemented system of claim 22, wherein the operations further comprise outputting a detection indicator based on detecting the target object.

25. The computer-implemented system of claim 24, wherein the detection indicator comprises a voice broadcast or a light indicator.

26. The computer-implemented system of claim 22, wherein obtaining the target image occurs within a predetermined acquisition time upon detection of a qualified target object.

27. The computer-implemented system of claim 21, wherein the recognition identifier comprises a pattern, and wherein the pattern comprises a positioning feature that maps the pattern onto the target object.

28. The computer-implemented system of claim 21, wherein obtaining the target image comprises obtaining the target image by an image detector of a mobile electronic communication device, and
   wherein mapping the recognition identifier onto the target object comprises: presenting the recognition identifier on a display of the mobile electronic communication device, and
      mapping the recognition identifier on the display onto the target object, wherein the image detector and the display are located in front of a same side of the target object.

29. The computer-implemented system of claim 28, wherein the mobile electronic communication device comprises a smartphone, the display comprises a screen of the smartphone, and the image detector comprises a front-facing camera of the smartphone,
   wherein obtaining the target image comprises capturing the target image with the front-facing camera, and
   wherein mapping the recognition identifier onto the target object comprises using illumination from the screen of the smartphone to map the recognition identifier displayed on the screen of the smartphone onto the target object.

30. The computer-implemented system of claim 21, wherein the recognition feature comprises any one or more of a color feature, a texture feature, a shape feature, or a spatial relationship feature.

\* \* \* \* \*